July 23, 1935.  J. F. WAIT  2,009,366
PROCESS OF PURIFICATION OF HYDROCARBONS
Filed Oct. 18, 1930
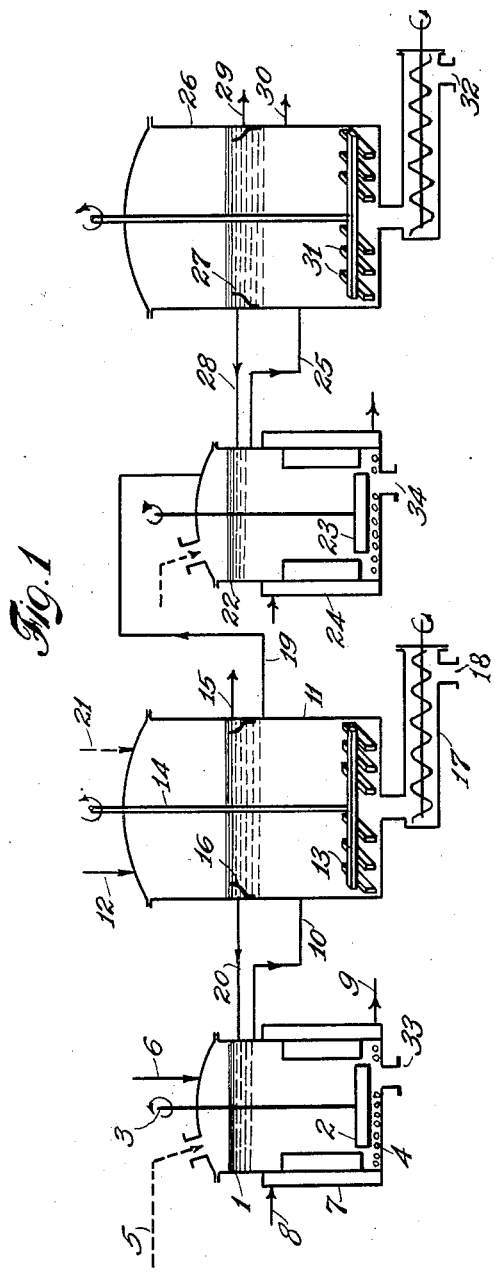
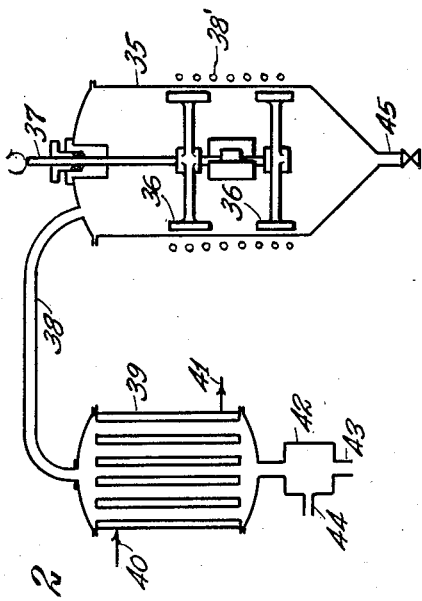
INVENTOR
Justin F. Wait Patented July 23, 1935

2,009,366

UNITED STATES PATENT OFFICE 2,009,366

PROCESS OF PURIFICATION OF HYDROCARBONS

Justin F. Wait, New York, N. Y., assignor to John C. Wait, New York, N. Y.

Application October 18, 1930, Serial No. 489,700

4 Claims. (Cl. 196—14)

This invention relates to improvements in methods of removing siliceous and other impurities from hydrocarbons and similar substances. It affords means for removing such impurities which interfere with or prevent refining operations or which are undesirable as a component of the final purified product.

Hydrocarbons such as petroleum and those associated with soft coal often contain from a fraction of a percent up to about 65% of siliceous and other "impurities" including carbon which may be in an agglomerated or partially agglomerated form. The common refining procedure with hydrocarbons containing a low percentage of impurity is to allow the impurity to pass into stills or other similar apparatus and to remove therefrom desired portions. The sludge or residue then generally contains the impurity and in association therewith, a corresponding amount of valuable material is usually lost. In the case of soft coal the hydrocarbons are driven off at high temperature leaving a "coke" as residue.

A cracking process for example, generally treats a petroleum or other product which contains such impurities. Newly formed carbon is frequently released during the cracking and will then become associated with other impurities and this results in increase in "tailings loss" and frequent shut-down for cleaning and/or repair.

My process involves means for effecting separation of portions or substantially all of such impurities and preferably before treatment or after partial treatment or pretreatment. I have found that if the viscosity of the petroleum is lowered a partial separation may be effected. This may be done as by admixture with a miscible liquid such as a lighter hydrocarbon. Other miscible liquids which are non-oily may be used for such mixing or they may be applied with the adsorptive treating agent. Heat may be used to assist in lowering the viscosity.

The velocity of separating as by settling or centrifugal force may be increased as by application of an electrical charge to neutralize that carried by colloidal particles. Other means of neutralizing the charged particles may be used. The effect of gravity may be supplemented by or substituted by the effect of application of an electrical potential. An electric force may be applied as a direct potential or as a magnetic, electrostatic or other means.

An adsorptive agent or other form of clarifier may be used to facilitate separation of the impurities when they are mobile. This may be done as by agitating diatomaceous earth or other like substance of known clarifying action with the fluid hydrocarbon. If one of the common clarifiers such as fuller's earth is used the impurities adsorbable by bentonite and the like are preferably later removed by contact with such agent. Properly prepared adsorptive agent such as common acid-treated bentonite may be used to clarify the liquid as well as to remove adsorbable impurities. Ordinary bentonite or the like may by very careful filtration be caused to produce a clarified liquid.

I have found it frequently advantageous to treat the hydrocarbon before contacting the same with such an adsorptive agent. Likewise an adsorptive substance which contains an electric charge or one on which one may be formed will sometimes assist in causing the adsorption of impurities. Such a charge may also be formed on the impurity to be adsorbed.

For example, if a charge is given to sulphur contained with hydrocarbon in the vapor phase, the same may be moved in magnetic, electric or other field and so concentrated. With a charge, the sulphur particles may be more readily adsorbed as by fuller's earth, activated bentonite and like products especially when the latter are of opposite polarity. Because of the variance in the oils and impurities cut-and-try methods must be utilized to work out desirable operating procedure in view of the nature of the oil treated and the desired quality of the final product.

The process as applied to a sand bearing oil may be carried out by lowering the viscosity of the oil, as by agitation of light hydrocarbon therewith. The fluid liquid containing the heavy oil in solution may be readily separated from the sand. This oil will generally contain impurities which are removable by adsorption wherefore the same is contacted with a bentonite or like agent. Some sands yield organic particles which may be removed as by allowing them to rise to the surface or as by utilizing a floatation method. The sand may be further washed and if drainage or centrifugal methods do not recover a sufficient quantity thereof, heating under vacuum or other method may be employed. Water especially if warm, will recover portions of the lighter fluid.

My preferred method involves separation of substantially all portions of sandy material which can be settled out before the adsorptive agent is added. I also prefer to separate the floatable matter before the adsorptive agent is added. In some instances an adsorptive agent may be added before all of the sandy matter is removed and particularly so when a portion of the sandy matter is not readily removable by settling.

Some general features of this invention including methods of producing and preparing adsorptive and clarifying agents are shown in Patents 1,907,690 and 1,930,572. The former patent shows how the adsorptive surface may be prepared and used including recovery of purified oil by distillation under vacuum in the presence of adsorptive agent. The latter patent shows improved methods for utilizing such agents including use of miscible liquids, exclusion of air and applying charges to treating agent.

Economic factors may at times require refining of petroleum in a manner to form products of low viscosity which have low market value and which may be worth even less than the crude. Gaseous by-product may also be unsaleable. In such instances I have found it advisable to return low priced products to beneath the surface and into contact with oil bearing sand. This will result in dilution and a form of extraction of the heavier oil so that subsequent withdrawal will include crude which may be more completely removed and also so that the siliceous and other impurities will be separated in part at least underground.

In this manner the more valuable oil which contains the saleable light gasoline range and oil suitable for lubricants may be withdrawn. Sand which subsequently contains a fluid oil may be later removed as by water which can then be introduced as the structure of such sand will allow water to pass therethrough. Gases such as those of combustion may be introduced to occupy space over the oil and above the pumping zone.

If the sand becomes wetted with an oil of low viscosity a high recovery may be effected. Such oils may contain agents to facilitate or cause treatment underground. Light oil drains nearly completely whereas a more viscous oil would be retained thereby in much greater amounts. Light oils may also be removed as by heating or using steam. Velocities are preferably kept low to increase the efficiency of separation of impurities.

The losses of refinery operation include oil associated with the solid and/or colloidal particles such as carbonaceous or siliceous matter. By removing substantial amounts of the indigenous quantities of such particles and properly controlling the refinery operation the losses due to this cause may be greatly reduced and will become of a minor order.

The process may be varied as for separation of some forms of waxes which may be readily accomplished if the distillate containing the same is similarly diluted with a miscible liquid. This renders a more fluid substance which is in general more susceptible to wax separating means. The separation may be further facilitated by adding hydrogen to render the waxes in a more "crystalline" form.

Upon cooling the mixture of oil containing wax and miscible liquid, wax will be precipitated. If the miscible liquid is water soluble, such as an alcohol, precipitation may be influenced or caused as by addition of water. The precipitation and/or separation may be facilitated as by having present in said mixture particles such as hematite or other heavy substance or one electroactive or otherwise active. Fuller's earth and similar materials may also be used. If an adsorptive substance such as bentonite is employed, it may be used as a concentrating agent for hydrogen or methane and so cause production of a more "crystalline" or other form.

Such precipitation may also be promoted or influenced by forming an emulsion and causing the non-waxy portion to initiate crystallization. Wax will then follow therewith in forming crystals. This may be due in part as to concentration of the waxeous substance in the interface of the small particles such as are contained in the emulsion.

Where the carbonaceous and/or siliceous matter is associated with hydrocarbons to form a mass of practically homogenous portions we have a coal or coal-like substance. In separating the carbon and/or silica from the hydrocarbon the process may be varied accordingly.

If an oil containing carbonaceous matter is treated with coal under pressure and/or high temperature, the coal will yield a hydrocarbon which may become mixed with the oil. This action generally forms an oil of lowered viscosity. Carbonaceous matter of the oil is generally in colloidal form and may be caused to become associated with coal and so facilitating separation of said colloidal matter from an oil. The so-purified oil may be transferred to a remote point while the coal particles which have accumulated the carbonaceous matter of the oil may be used or treated separately.

Under some conditions coal in finely divided form may be treated with water and the siliceous content thereof allowed to settle or be similarly separated. In other instances a mixture of oil and water may be used to effect a separation of siliceous matter.

Volatile hydrocarbons may be easily separated from coal and coal-like products by treatment with a solvent such as light petroleum distillate and preferably under high pressure. For this purpose it is preferable that solvent hydrocarbons be used which are gaseous at about ordinary pressure and temperature or at about twenty pounds under the treating temperature. For example natural gas under pressure may be contacted with coal and used to yield hydrocarbons therefrom. This may be done at near ordinary temperature. The process may be that of a form of extraction.

By forming a mixture of coal in finely divided form and oil it is possible to transport coal economically to great distances at low cost. During the transfer the extraction and/or other processes may take place. In effect the coal acts as an agent of treatment in respect to the oil. It may yield an oil lowering the viscosity and/or it may adsorb carbonaceous and other impurities from the oil. Pipe line pressure may be run up to about 800 or 1000 lbs. pressure and the time for transfer is generally days wherefore conditions are favorable for giving a thorough reaction as indicated.

It is frequently not out-of-the-way for all oil pipe lines to pass through a coal field. This makes it possible to use crude or partially treated oil for such purpose.

I have found it desirable in some cases to add hydrogen to oil to be mixed with coal which has been subjected to an "extraction" process. Such procedure is carried out so that the "coking" of the coal and/or cracking of coal tar contained therein is in a reducing atmosphere. This results in increase of production of desired product.

Coal containing hydrocarbons may be treated while a reducing condition is maintained within the reaction zone. Hydrogen gas or methane are examples of gases which may be present to cause or aid in maintaining a reducing condition. Reduction and/or methylation of unsaturated compounds, acids and the like influence the yield and favor products for which there is a demand.

Phenolic, acid and other bodies may be separated by treatment of oil separated from the "coke". An alkali may be used for this and acid later used to liberate the same from the alkali salt so formed.

My invention may be carried out as illustrated in Figs. 1 and 2. Fig. 1 represents mixing, extraction and separation steps while Fig. 2 represents a distillation step.

A closed vessel 1 provided with agitator 2 driven by shaft 3 may be used to break up and mix lumps 4 of nonfluid oil containing impurities which may be introduced as indicated by line 5. Light or heavy distillate or light crude oil may be introduced as indicated by line 6. Heat may be applied as by means of jacket 7 with lines 8 and 9 for introducing and withdrawing heating medium. After about one or several hours of mixing the mass may be flowed through line 10 to vessel 11 whereat additional light liquid such as heavy gasoline may be introduced as by means of line 12.

Vessel 11 is preferably of large volume and provided with a slow moving rake 13 driven by shaft 14. Controlled settling takes place and floated matter may be withdrawn as by means of line 15 connecting with overflow trough 16. Heavy matter may be moved towards the center and conveyed as by conveyor 17 to outlet 18 provided with valve, baffler or other parts as required. Solid matter may be dried as by vacuum distilling volatile matter as with a rotary or drum dryer. Selected liquid may be withdrawn as by line 19 and flowed for further treatment as with filter aid or to the still as through a filter or centrifugal for additional clarification. Vessel 11 may be provided with temperature and pressure control means not shown. Additional liquid may be added and the solid matter rinsed as by rotating shaft 14, or another shaft with blades, at high speed and wash liquid may be returned to vessel 1 as by means of line 20. Filter aid or the like may be introduced into vessel 1 or into vessel 11 as by means of lines 5 and 21.

The clarified or partially clarified oil may flow to vessel 22 with agitator 23 and jacket 24. Filter aid may be added thereat and separated as by flowing through line 25 to vessel 26 similar to vessel 11 with trough 27 and liquid outlets 28, 29 and 30 and blades 31. Solids or solids and liquids may be discharged through outlet 32. Outlets 33 and 34 may be controlled by valves or gates and used to discharge solids or solids and liquids as required. Liquid from outlet 19 or 30 may be flowed to still 35 of Fig. 2.

The still 35 is preferably agitated with scrapers 36 rotated by shaft 37. Inductive heating coils 38 or other heating means may be used. Volatile matter flows through line 38 to condenser 39 with connections 40 and 41 for cooling means. Separator 42 may be used to discharge liquid through 43 and gaseous fluid through 44 to another condenser or pressure control means not shown. Heavy oil may be discharged as through outlet 45.

Each product to be treated generally requires special modification wherefor the illustration shows only the general steps of the process. The desired final form may also determine the exact procedure to be used. In general experiment is required to determine the kind of liquid to be added, the amount and the temperature and/or pressure. The method of flotation and kind and amount of floating agent is also determined by test.

I do not limit my claims to the exact methods and procedures described. Other equivalent methods may be used and the procedure varied as required to produce the desired result from the conditions at hand.

I claim:

1. The process which comprises contacting nonviscous oil containing sand and carbonaceous matter in substantial amount with a light hydrocarbon, extracting said oil from the sand, contacting an adsorptive agent with the hydrocarbon-oil mixture, adsorbing impurities therefrom, separating light hydrocarbon from heavy hydrocarbon contained in the so extracted oil and removing adhering light hydrocarbon and associated heavy oil by addition of heat and vacuum to the sand and volatilizing and recovering so removed hydrocarbons.

2. The process which comprises treating viscous nonflowing oil containing sand and carbonaceous matter and organic matter with a light nonviscous oil to form a liquid mass while holding the components at about normal temperature, floating light organic matter while settling sandy matter, separating portions substantially free from sand and floated organic matter, treating a separated portion with an adsorptive bentonite-like surface and adsorbing impurities contained in the oil, and separating purified liquid from the adsorptive surface and adsorbed impurities.

3. The process of recovering and refining oil of petroleum at about normal temperature which comprises treating viscous nonflowing oil containing sand and carbonaceous matter and organic matter with a light nonviscous oil to form a liquid mass, floating light organic matter and causing heavier sandy portions to settle, separating portions substantially free from floatable matter and matter which will settle, treating a separated and so purified portion with an adsorptive surface like bentonite, and separating purified liquid from the adsorptive surface and adsorbed impurities and removing oil from the sandy portion by applying heat and vacuum thereto.

4. The process which comprises treating viscous non-flowing oil containing sand and carbonaceous matter and organic matter with a light non-viscous petroleum distillate to form a nonviscous liquid mass while holding the components at about normal temperature, floating light organic matter constituting an impurity while settling sandy matter, separating portions substantially free from sand and floatable organic matter, treating a separated portion with an adsorptive bentonite-like surface and adsorbing impurities contained in the oil, and separating purified liquid from the adsorptive surface and adsorbed impurities while treating settled sandy portions which have been freed from drainable portions of hydrocarbon liquid with hot water to recover other portions of hydrocarbon liquid.

JUSTIN F. WAIT.